US006173179B1

United States Patent

(12) United States Patent
Coutant

(10) Patent No.: US 6,173,179 B1
(45) Date of Patent: Jan. 9, 2001

(54) TRANSMISSION SYSTEM WITH VARIOUS MOBILES, COMPRISING A NETWORK LIST, METHOD OF UPDATING SUCH A LIST AND MOBILE IN WHICH THE METHOD IS IMPLEMENTED

(75) Inventor: François Coutant, Fegersheim (FR)

(73) Assignee: U.S. Philips Corporation, New York, NY (US)

( * ) Notice: Under 35 U.S.C. 154(b), the term of this patent shall be extended for 0 days.

(21) Appl. No.: 09/139,202

(22) Filed: Aug. 24, 1998

(30) Foreign Application Priority Data

Aug. 27, 1997 (FR) .......... 97 10690

(51) Int. Cl.[7] .......... H04Q 7/20

(52) U.S. Cl. .......... 455/432; 455/434; 455/414; 455/550

(58) Field of Search .......... 455/422, 432, 455/434, 435, 414, 550

(56) References Cited

U.S. PATENT DOCUMENTS 5,590,397 * 12/1996 Kojima .......... 455/414
5,613,204 * 3/1997 Haberman et al. .......... 455/432
5,613,213 * 3/1997 Naddell et al. .......... 455/414

FOREIGN PATENT DOCUMENTS

0781064A2 6/1997 (EP) .......... H04Q/7/32
2754658 10/1996 (FR) .

OTHER PUBLICATIONS

"The GSM System for Mobile Communication", By Michel Mouly and Marie–Bernadette Pautet, Published by the Authors, 1992.

* cited by examiner

*Primary Examiner*—Dwayne D. Bost
*Assistant Examiner*—Temica M. Davis
(74) *Attorney, Agent, or Firm*—Dicran Halajian

(57) ABSTRACT

The invention discloses a base station and various mobiles. At least one of the mobiles may also be connected to another system including a base station. This mobile has a list of all the systems to which it may be connected. In an advantageous manner, this list may be updated automatically.

8 Claims, 4 Drawing Sheets

KK5
KK0
KK1
KK10
CT[i],R[i]
KK12
R[i] θ HPLMN
"Y"
i=i+1
KK14
T[i]<T[1,...,i MAX]
"Y"
i = i+1
KK16
"F"
L
R[i] ⇒ L
KK18
KK20
"Y"
i=i MAX
i=i+1

TRANSMISSION SYSTEM WITH VARIOUS MOBILES, COMPRISING A NETWORK LIST, METHOD OF UPDATING SUCH A LIST AND MOBILE IN WHICH THE METHOD IS IMPLEMENTED

The invention relates to a radio transmission system forming a telecommunications network to which at least one telecommunications mobile is connected for a called subscriber to move about in coverage areas belonging to said telecommunications network and in areas belonging to other networks, the mobile comprising:

storage means for storing network names and quality indices assigned to each of said networks.

The invention also relates to a method of establishing a list of networks and also a mobile in which the method is implemented.

The possibility of being connected to another network than the one to which one has made a subscription is known in GSM terms by the name of roaming. On this item one may notably be referred to the title: "The GSM System for Mobile Communication" by Michel MOULY and Marie-Bernadette PAUTET published by the authors whose address is 4 rue Elysée Reclus—F-91120 FRANCE.

A system of this type is described in the patent application filed in France on Oct. 16, 1996 under no. 96 12629 in the name of Philips Electronics N.V. published under no. 2754658. In this system the quality index assigned to each of the networks is the time during which the mobile could be connected to the respective network.

The problem which is then posed is to choose the network to which one wishes to be connected. The user may be called upon for help to choose his network bearing in mind the quality index. In the patent application in question there was suggested to establish a list of these networks to which one could be connected. However, a problem remains, that is, the updating of said list.

The present invention proposes a system of the type defined in the opening paragraph which provides for the user a list which is updated as he wishes.

Therefore, such a system is characterized in that there are provided:

means for automatically updating said list while taking the quality indices into account.

An important characteristic feature of the invention according to which the quality index is the time duration for which the mobile could be connected to said network to which this index is assigned provides great reliability for a suitable choice of the network to which the subscriber can be connected. This choice, based on this time duration is a better quality than a choice based on the received level as is customarily the case.

Thus, thanks to the invention for enabling the user to choose a network with which he can work, the user has a list which can automatically be updated and has good choice criterions.

These and other aspects of the invention will be apparent from and elucidated with reference to the embodiments described hereinafter.

Figure 1:
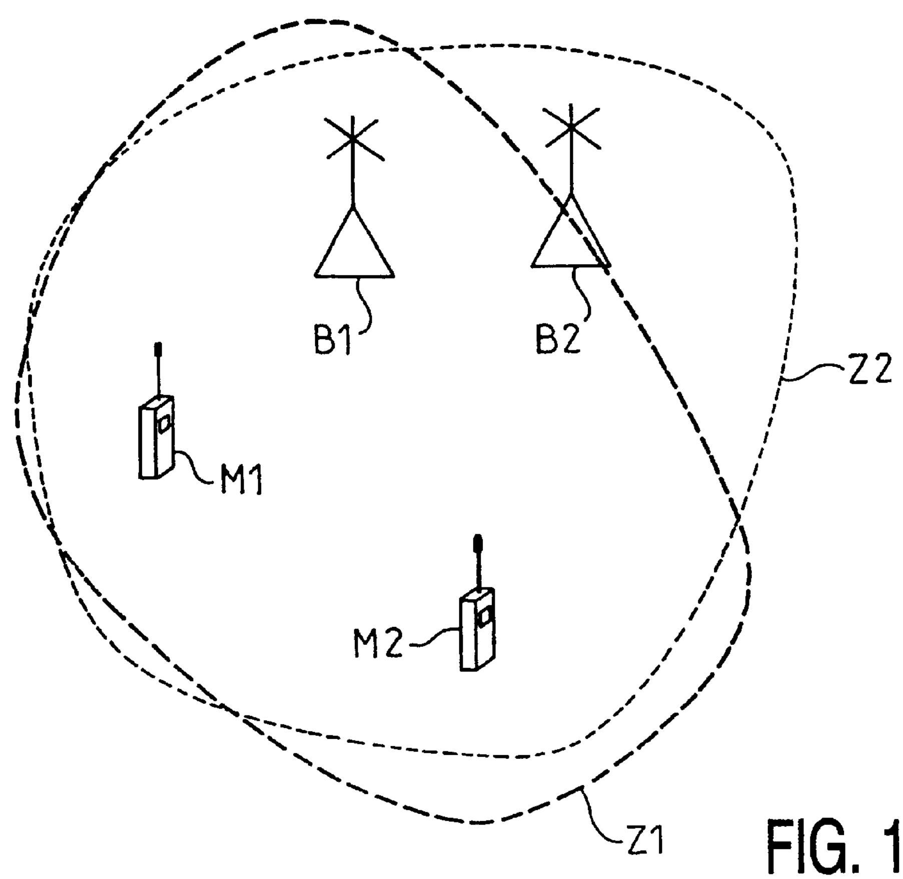
FIG. 1 shows a system according to the invention.

In FIG. 1 is shown in a diagram a first transmission system (or network) of the GSM type. It will be recalled that this system is a cellular system which implies a coverage in the form of cells. Each cell has a frequency range or a frequency channel which is repeated every seven cells for cells of hexagonal form. In FIG. 1 the system shown is notably formed by a base station B1 which serves as an intermediary for all the communications in which at least one of the two mobile stations is concerned: M1 or M2. These mobile stations M1 and M2 are located in the coverage area Z1 of the base station B1. This area is bounded in the FIG. 1 by a bold dashed line Z1. As often happens in practice, the mobiles may be located in coverage areas belonging to networks to which they do not have a subscription. For example, as is shown in the Figure, the mobiles M1 and M2 are also located in the coverage area Z2 of another base station B2 of a different network from that of station BI and which could also be satisfactory to the user.

Figure 2:
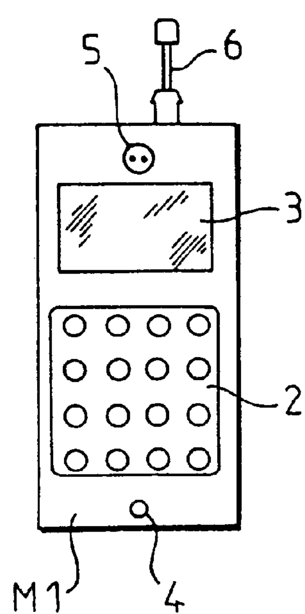
FIG. 2 shows a telecommunications mobile according to the invention.

In FIG. 2 is shown the mobile station M1 according to the invention. It comprises, as is customary, a keyboard 2, a display 3, a microphone 4, an earphone 5 and an antenna 6. This station operates on an electric arrangement which is shown in FIG. 3.

Figure 3:
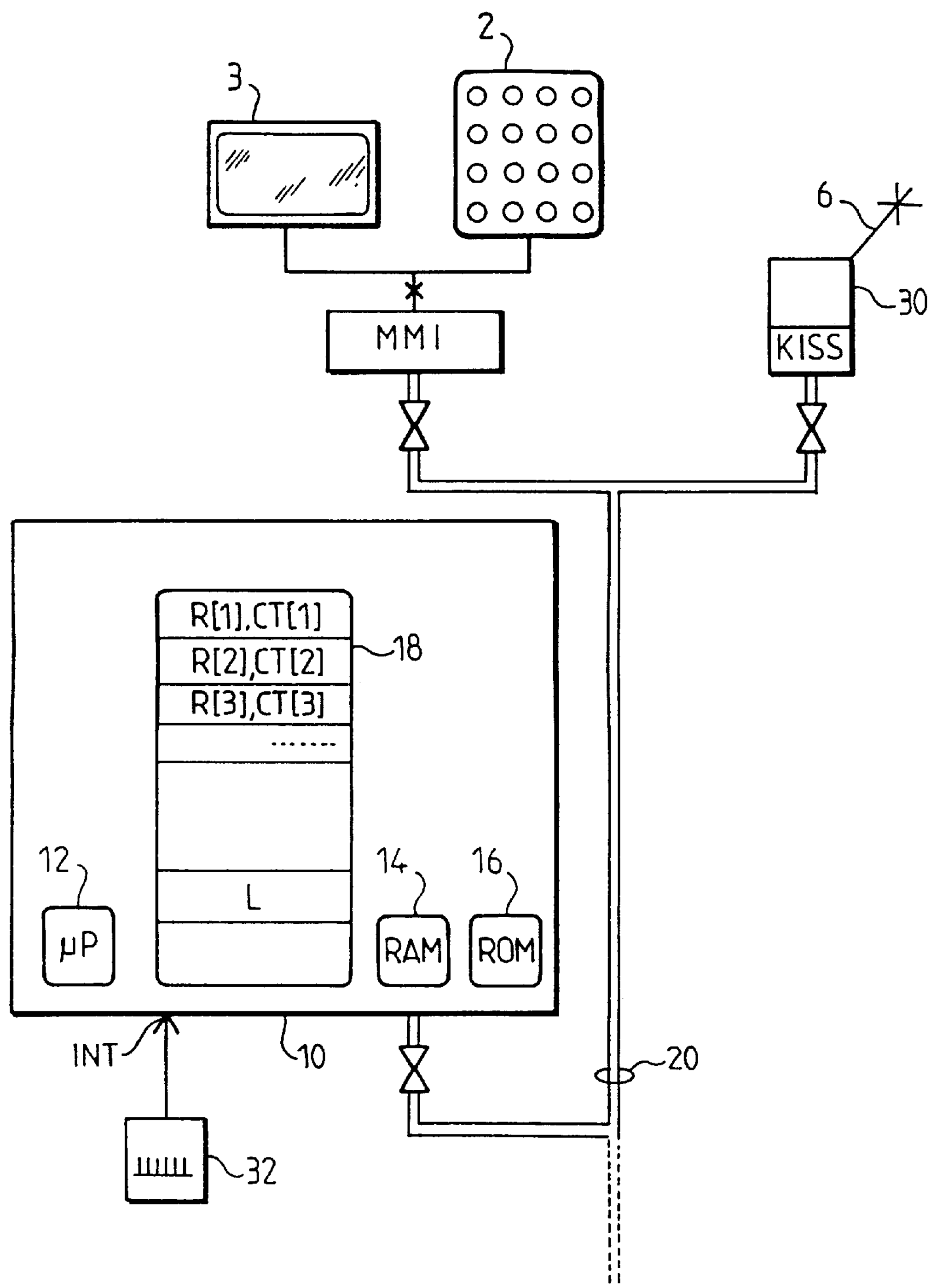
FIG. 3 shows the structure of the electrical assembly included in said mobile.

This FIG. 3 shows the structure of the electric arrangement of the mobile station M1. This arrangement is formed by a microprocessor assembly 10 formed by an actual microprocessor 12, a random access memory RAM 14, a read-only memory ROM 16 and a memory of the EEPROM type 18 which permits of storing and maintaining data, even the turned-off station. The data processed or to be processed by this assembly 10 travel by a common data line 20 which is connected to the keyboard 2 and to the display 3 via a man-made interface MMI and which is also connected, inter alia, to the transceiver circuit 30 via a radio control interface KISS. As described in cited patent application, the memory 18 contains a table having locations CT[1], CT[2], CT[3], . . . which are used for providing indications about the duration for which one could be connected to a respective network R[1], R[2], R[3], . . . other than that to which the user is subscribed. These memories CT[1], CT[2], CT[3], . . . , when authorized, are incremented in timing with a clock 32 which produces signals on an interrupt input INT so that an interrupt program is executed for incrementing them or not.

According to the invention, based on the table containing the name of the networks with the indication of the duration in question, a list is made up which is placed in location L of the memory.

Figure 4:
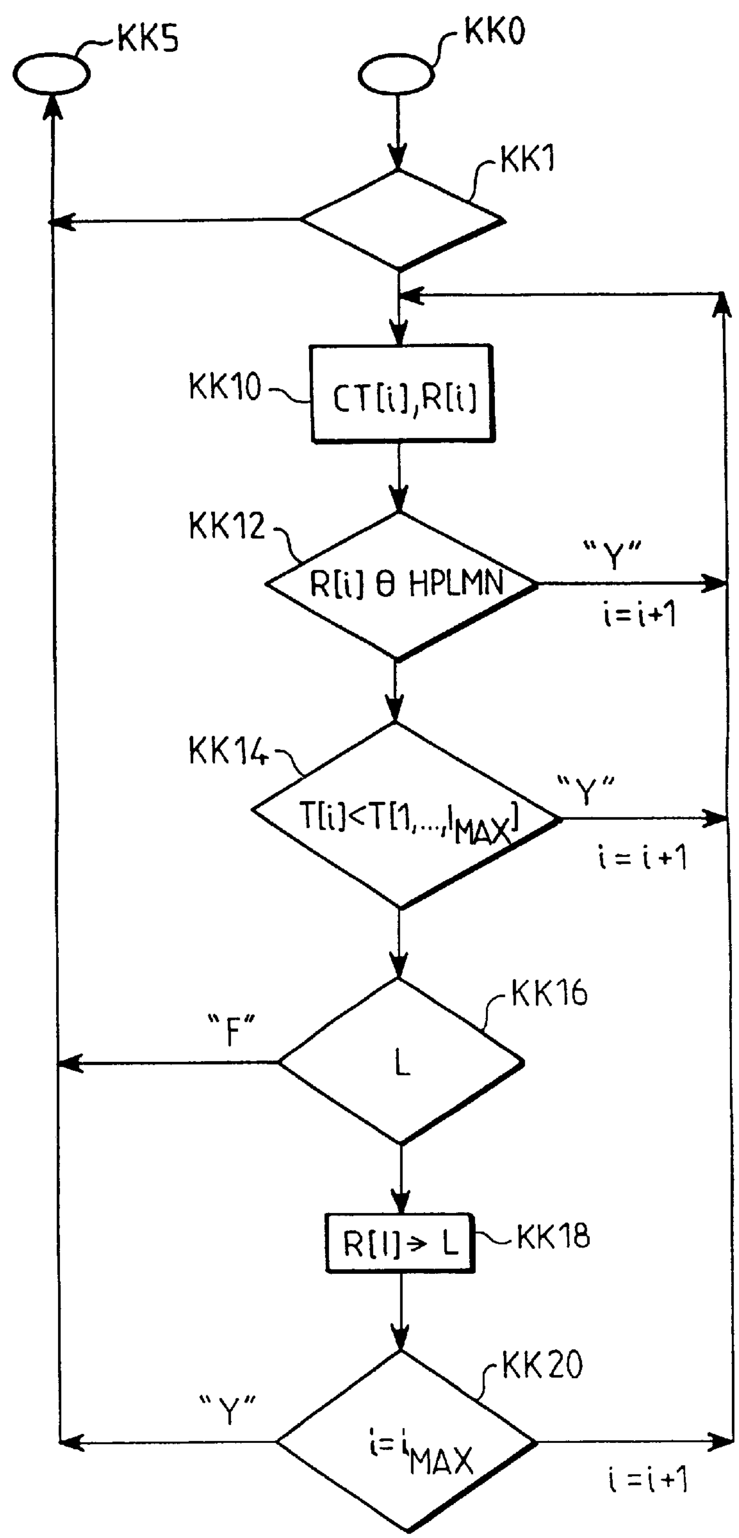
FIG. 4 shows the flow chart for updating the list according to the invention.

FIG. 4 shows the operation flow chart of the mobile station according to the invention. This flow chart has a box KKO which indicates the beginning of the program. The user is thus asked whether he wishes to commence the updating process of his list (box KK1). If the user refuses, box KK5 is proceeded to which is the exit of the updating program of the list. If the user wishes to commence the updating program, box KK10 is proceeded to.

This box KK10 represents the table containing all the networks R[i] one has contacted, with facing them the cumulated duration CT[i] of this contact. This duration is given by the contents of the counters mentioned above. This table offers a classification as a function of the duration of the contents of these various counters CT[i]. This table will be examined in the decreasing order of these durations. Each of the networks registered in this table will be examined in this order.

The first thing which is examined (box KK12) is to know whether this network is the network to which one is subscribed. If this network is, no measure is taken and the next network is examined. If not, box KK14 is proceeded to. In this box are examined the contents of the counter to know whether this time is the shortest of all the networks belonging to the same country as this network. If so, box KK10 is returned to to examine the next network. If the test of the box KK14 indicates a suitable time, the network is then a candidate for forming part of the list, provided that this list has a place for the network to be inserted. This is illustrated in box KK16. If the list has room, the name of the network is inserted into the list (box KK18). Then, finally, a test is made in box KK20 whether all the networks have been examined ($i=i_{MAX}$). If not, box KK10 is returned to to process the next network. If all the networks have been examined, then the updating is considered terminated and this updating program is abandoned (box KK5).

Figure 5:
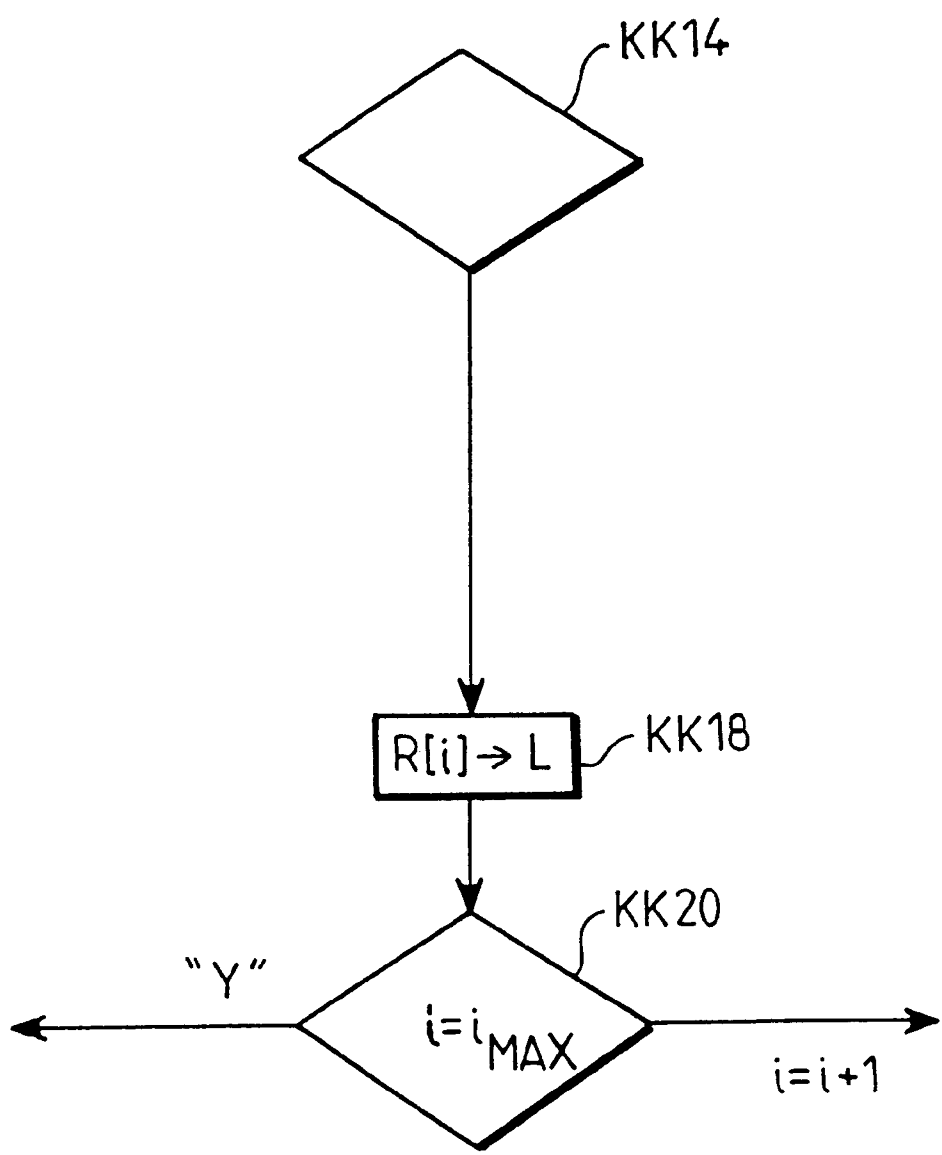
FIG. 5 shows a variant of a flow chart for updating the list.

Various options may be envisaged for eliminating network names from the list:

either automatically, when one wishes to insert a new name, one name is replaced in the list as this is shown in FIG. 5. One directly goes from box KK14 to box KKI8.

or "manually" by validating items in a menu which appears on the display. Thus, the various networks can be displayed, canceled, replaced, and so on. This forms part of the customary things in this kind of apparatus.

Still as a variant, the updating may be triggered each time the mobile moves about. This may be realized by putting a flag on a menu option which signals that the updating will be effected or not on switch-on.

What is claimed is:

1. A radio transmission system forming a telecommunications network to which at least one telecommunications mobile is connected for a called subscriber to move about in coverage areas belonging to said telecommunications network and in areas belonging to other networks, the mobile comprising:

storage means for storing in a list network names and quality indices assigned to each of said networks, and means for automatically updating said list while taking the quality indices into account, wherein the quality index is time duration for which the mobile could be connected to said network to which the quality index is assigned.

2. A system as claimed in claim 1, wherein the automatic updating is triggered by a user of said mobile.

3. A method implemented in a telecommunications mobile connected to a system forming a telecommunications network to which said mobile is connected to for a called subscriber to move about in coverage areas belonging to said telecommunications network and in areas belonging to other networks, the method comprising:

establishing a list containing detected networks each having a quality index, wherein the quality index is time duration for which the mobile could be connected to said network to which the quality index is assigned, detecting a request for updating the list, after detection of order of said request for updating, for all the detected networks of the list, examining the quality index of each of said detected networks, inserting the network into the list of networks having adequate quality.

4. A method as claimed in claim 3, further comprising, after the detection of the order of the request for updating of said list, examining a next network if an examined network belongs to a network to which the user is subscribed.

5. A method as claimed in claim 3, further comprising, after the detection of the order of the request for updating of said list, rejecting a network that presents a network having an adequate quality index if said list is full.

6. A mobile for connection to a radio telecommunication system comprising:

connection means for connecting to another system, first storage means for containing a table of various networks with quality indices attached to each of said various networks, second storage means for containing a list of preferred networks, updating means for updating said list as a function of the quality index, wherein the quality index is time duration for which the mobile could be connected to said network to which the quality index is assigned.

7. A mobile telephone comprising:

a memory which stores a list, said list including names of networks and durations of time said mobile had been connected to each of said networks; and a processor which examines said networks on said list based on a decreasing order of said durations.

8. The mobile telephone of claim 7, wherein said processor updates said list based on said decreasing order of said durations.

* * * * *